March 23, 1937.  G. H. FRASER  2,074,837
GEAR DRIVE OR FLEXIBLE ROLLABLE BELT
Original Filed Oct. 25, 1932  3 Sheets-Sheet 1

INVENTOR.
George Holt Fraser

March 23, 1937.  G. H. FRASER  2,074,837
GEAR DRIVE OR FLEXIBLE ROLLABLE BELT
Original Filed Oct. 25, 1932  3 Sheets-Sheet 2
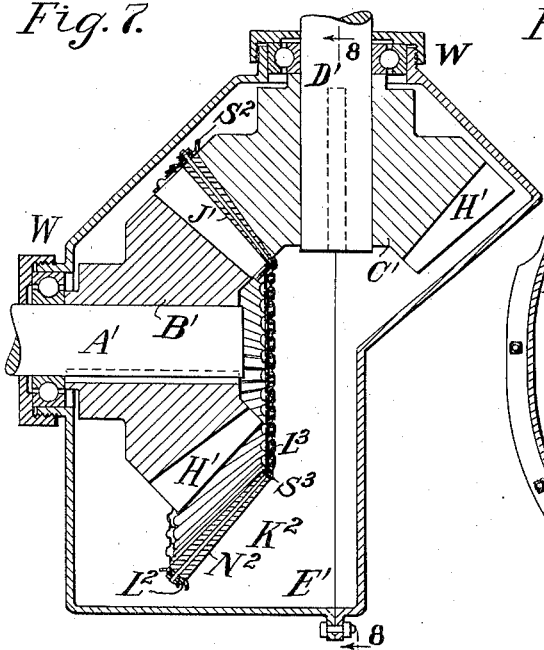
Fig. 7.
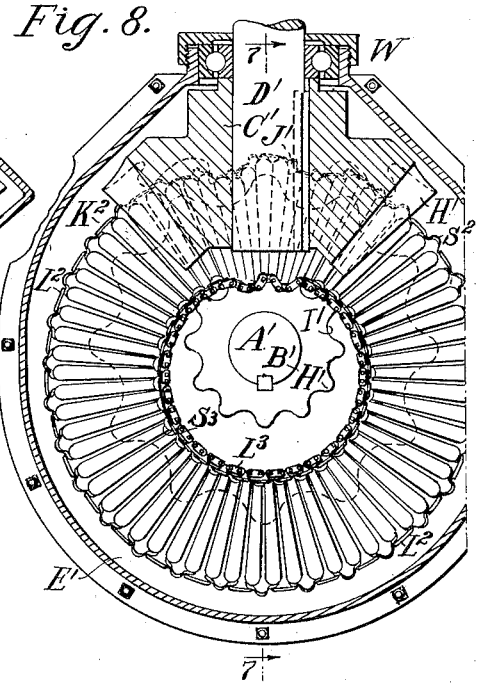
Fig. 8.
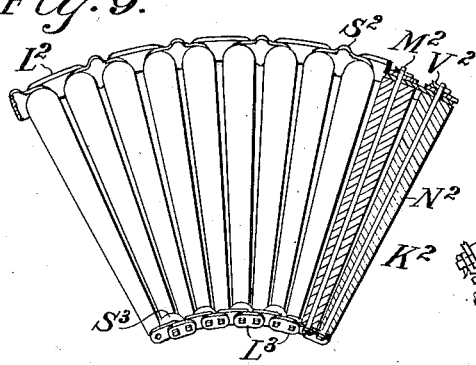
Fig. 9.
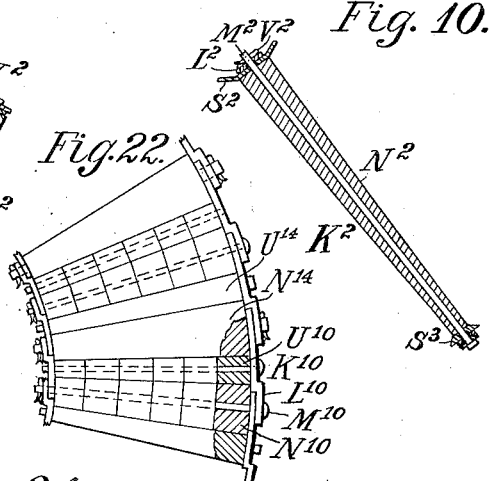
Fig. 10.
Fig. 22.
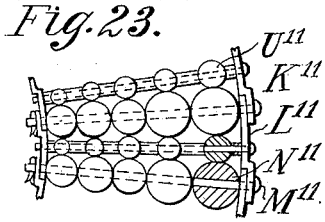
Fig. 23.
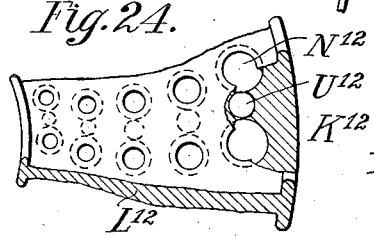
Fig. 24.
INVENTOR.
George Holt Fraser March 23, 1937. G. H. FRASER 2,074,837
GEAR DRIVE OR FLEXIBLE ROLLABLE BELT
Original Filed Oct. 25, 1932   3 Sheets-Sheet 3
Fig. 11.    Fig. 12.    Fig. 13.
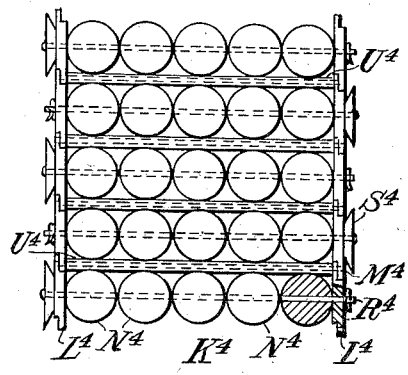 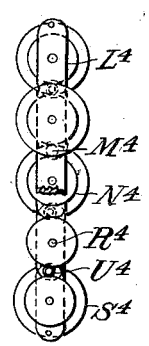 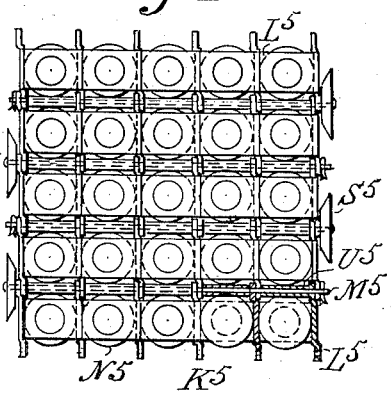
Fig. 14.
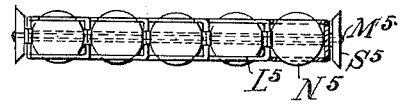
Fig. 15.    Fig. 16.    Fig. 17.    Fig. 18.
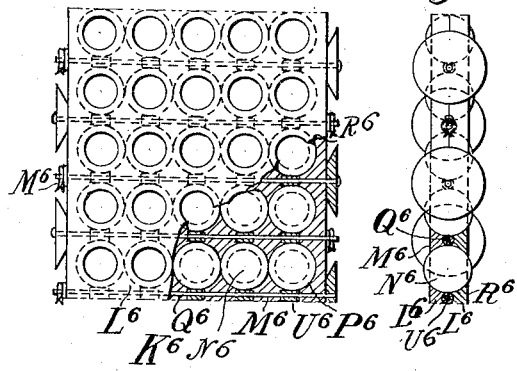 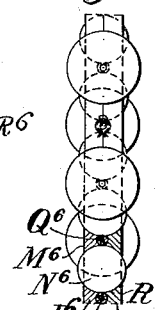 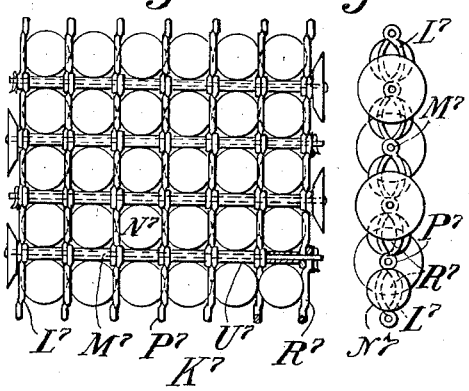
Fig. 19.    Fig. 20.    Fig. 21.
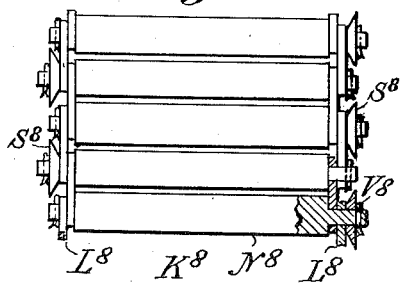 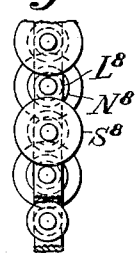 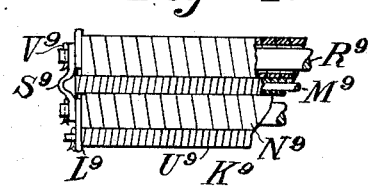
INVENTOR.
George Holt Fraser Patented Mar. 23, 1937

2,074,837

UNITED STATES PATENT OFFICE 2,074,837

GEAR DRIVE OR FLEXIBLE ROLLABLE BELT

George Holt Fraser, Brooklyn, N. Y.

Original application October 25, 1932, Serial No. 639,464. Divided and this application August 31, 1935, Serial No. 38,778

15 Claims. (Cl. 74—231)

This application is a division of my original application Serial No. 639,464, filed October 25, 1932.

This invention relates to transmission of rotary motion, and aims to provide improved rollable anti-frictional stress transmission devices for rollably sustaining or transmitting stresses incident to rotary transmission.

In my said original application Serial No. 639,464 filed October 25, 1932, I have set forth and claimed a rotary transmission drive comprising beveled toothed drive and driven members, one rotatable and having divergently circumferentially spaced teeth in inter-meshing relation with those of the other, for rotatably transmitting torque stress from one to the other of said members, said teeth of each of said members having faces opposed to and spaced from those of the other for affording a wedge shaped circumferential space between opposed faces of said teeth, and a belt of greater width than thickness and of wedge shaped cross-section from one side edge to its other side edge, between said members within the wedge shaped space between two of said teeth, movable through said space, and in torque transmission contact with the opposed faces of two of said teeth, and adapted to transmit torque across said space and between said opposed faces, for drivingly connecting said teeth.

In said combination the stress transmission means includes a plurality of lateral series of longitudinally successive rollable members, operable to transmit stress at right angles to their longitudinal and lateral disposition from without one side of the series and through the thickness thereof to without the other side thereof, and a retainer means or web by which the rollable members are rollably retained and positioned, which is of less thickness than the diameter of the members and is operable to expose diametrically opposite portions thereof, and to permit these to receive stress from without one side of the retainer and to transmit it across the thickness thereof to without the other side thereof, without subjecting the retainer to said stress, and constitutes in itself an anti-frictional stress transmission device the utilization of which is not limited to its employment in the transmssion drives in my said application.

My present application pertains to said antifrictional stress transmission device itself, and aims to protect it for any purpose for which it may be utilized.

To this end in carrying out the preferred form of my present invention as applied to such a belt of the type having longitudinal and lateral series of longitudinally successively spaced, stress resistant rollable members having diametrically opposite exposed portions operable to transmit stress at right angles to the direction of their longitudinal and lateral disposition and from one side to the other side of said series, and a flexible web or retainer means revolubly connected to said members, movable therewith, operable to revolubly longitudinally and laterally position said members, of less thickness than the diameter thereof, disposed intermediate said exposed contact portions thereof, and operable to permit said spheres to transmit said stress from without one side of said web or retainer means, across the thickness thereof, and to without the other side thereof, without subjecting said web means to said stress, I provide rollable spacer means between and in rollable contact with the external peripheries of longitudinally adjacent pairs of said rollable members, for anti-frictionally rollably transmitting longitudinal stress from one to the other thereof, and I provide flared rollable axial restrainers which are rollable relatively to and of greater diameter than said rollable members, for rollably axially positioning the latter, and I provide various other features of improvement, all of which will be hereinafter more fully set forth.

In the accompanying drawings, which show various adaptations of my improvements, Fig. 1 is a fragmentary vertical axial section of drive and driven shafts and gears and their casing, in co-operative relation with one form of my anti-frictional stress transmission device, arranged as an endless flexible belt, the view being cut approximately on the line 1—1 in Fig. 2 and looking in the direction of the arrows;

Figure 1:
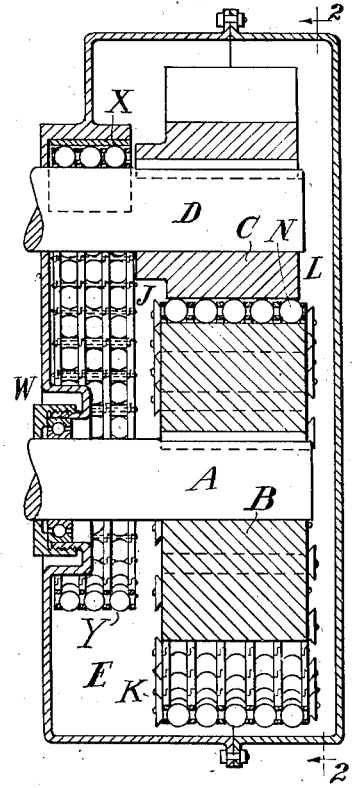
Figure 2:
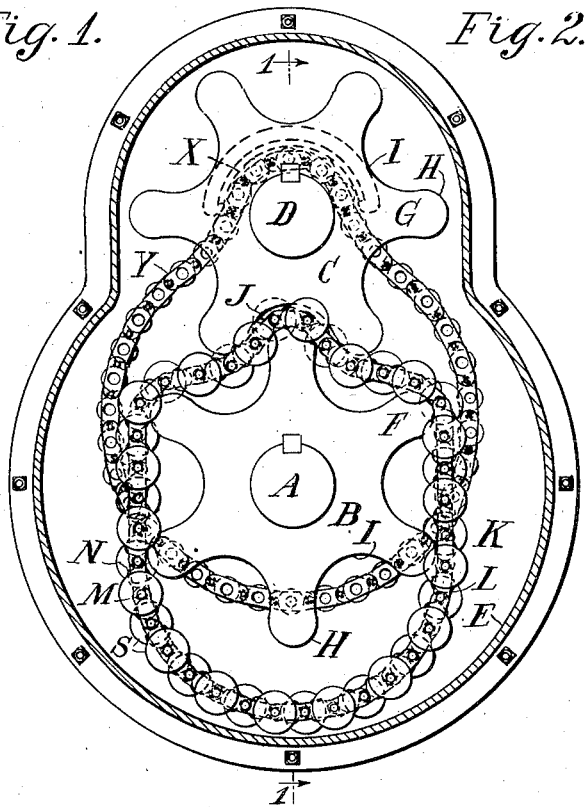
Fig. 2 is a fragmentary vertical cross-section thereof cut on the line 2—2 in Fig. 1 and looking in the direction of the arrows.
Figure 3:
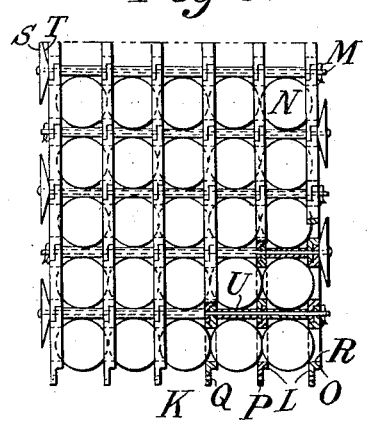
Fig. 3 is an enlarged fragmentary face view of the belt shown in Fig. 1, partly broken away to show it in longitudinal mid-section.
Figure 4:
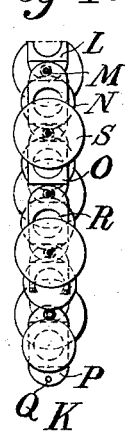
Fig. 4 is a fragmentary edge view thereof, partly broken away in longitudinal section.

Fig. 7 is a fragmentary vertical axial section of drive and driven shafts and beveled gears in cooperative relation with my anti-frictional stress transmission devise, and showing it in the form of a conical belt one side edge of which is longer than its other side edge, and the rollable members of which are tapered rolls, the view being cut approximately on the line 7—7 in Fig. 8 and looking in the direction of the arrows;

Fig. 8 is a fragmentary vertical section thereof cut approximately on the plane of the line 8—8 in Fig. 7 and looking in the direction of the arrows;

Fig. 9 is an enlarged fragmentary face view of the belt shown in Fig. 7, partly in longitudinal mid-section;

Fig. 10 is a fragmentary cross-section thereof;

Fig. 11 is a fragmentary face view partly in longitudinal mid-section of a modified form of my belt;

Fig. 12 is a fragmentary edge view thereof partly in longitudinal mid-section;

Fig. 13 is a fragmentary face view partly in longitudinal mid-section of another modified form of my belt;

Fig. 14 is a fragmentary cross-section thereof;

Fig. 15 is a fragmentary face view partly in longitudinal mid-section of another modified form of my belt;

Fig. 16 is a fragmentary edge view partly in longitudinal mid-section;

Fig. 17 is a fragmentary face view partly in longitudinal mid-section, showing another modified form of my belt;

Fig. 18 is a fragmentary edge view partly in longitudtinal section thereof;

Fig. 19 is a fragmentary face view partly in longitudinal mid-section of another modified form of my belt;

Fig. 20 is a fragmentary edge view thereof;

Fig. 21 is a fragmentary face view, partly in longitudinal section of another modified form of my invention in the form of a chain;

Fig. 22 is a fragmentary face view partly in longitudinal mid-section, of another modified form of my invention in the form of a chain;

Fig. 23 is a fragmentary face view partly in longitudinal mid-section, of another modified form of my invention in the form of a chain, and Fig. 24 is a fragmentary face view, partly in longitudinal mid-section, of another modified form of my invention in the form of a belt.

Referring to the drawings I will now describe in detail the forms of my invention and the utilization thereof therein shown.

In Figs. 1 to 4 let A indicate a drive shaft, B a spur gear drive pinion, C a reciprocal drive pinion drivingly reciprocal to said drive pinion, D a driven shaft keyed to the driven pinion, and E an oil reservoir casing for these parts.

These parts may be of any usual or suitable construction for gear transmission of rotary motion, those shown having the reciprocal drive faces of the gear teeth spaced from one another as by forming the spur gears with relatively small toothed ends H and with relatively large toothed cavities I, affording between the reciprocal teeth in working engagement a uniform sinuous space J, in which space, as claimed in my said original application, I interpose between the teeth a compression torque transmission belt K, which is sinuous, flexible and endless, and extended around one of the spur gears, and of sufficiently greater length than the toothed circumference thereof to permit the belt to bend into the belt space between intermeshing teeth, and to depend or discharge itself clear of other teeth of the spur gear it surrounds.

Usually for such uses the belt K is a compressive torque transmission traveling member, torque transmissive in the direction of its thickness, and at right angles to its length and breadth, of greater width than thickness, and of a thickness equaling the space J between the teeth, and of a width equaling the width of the teeth. For parallel gears I prefer to construct it of a continuous mesh of flexibly connected axially spaced links L, pivotally joined at their ends by rollable pins M, in the meshes or spaces between which links I preferably revolubly interpose rollable balls N, each of a diameter equaling the space J between the gears and sufficiently exceeding the width of the links to rollably space them from the surfaces of the gears. Thus the belt consists essentially of an endless mesh of axially spaced links, pivotally connected circumferentially by pins, and axially spaced by rollable balls flexibly retained in the interstices between them, the whole affording a flexible rollable fabric of sufficient mobility to conform to the convolutions of the inter-meshing teeth, and of sufficient thickness and compressive resistance to maintain correct mesh of reciprocal teeth and to transmit torque compressively, at right angles to the length and breadth of the belt, and in the direction of its thickness, from the spaced opposed faces of two inter-meshed teeth while in anti-frictional rollable engagement with them.

The mesh of the belt may be of any suitable construction, but I prefer to make the links L of punched metal having a thick body portion O and staggered reduced ends P for overlapping corresponding ends, and to perforate these ends with a pivotal hole Q for connecting them to succeeding links, and to perforate the body O with a cylindrical socket R for receiving and embracing the adjacent periphery of adjacent balls N, and preferably of such diameter as to just permit the peripheries of such balls to contact for axially spacing them. Thus their adjoining peripheries need not be axially spaced by the link, and need only contact with it to prevent their relative axial displacement, for avoiding unnecessary peripheral friction between the balls and the link.

According to one feature of my invention I provide rollable spacers, rollably carried by the belt, and disposed between and in rollable contact with the external peripheries of longitudinally adjacent pairs of rollable members, which are operable to rollably transmit stress from one to the next of said members, and thereby to antifrictionally position each from the external periphery of the other with minimum longitudinal stress on the belt.

These rollable spacers participate in the longitudinal travel of the rollable members, and longitudinally progress them by rolling each from the next, and rollably transmit such progression to the belt, to the end of progressing it with the rollable members with minimum resistance to their rollability.

This may be accomplished in any suitable manner, but to accomplish it I prefer to connect the overlapped ends of successive links by a rotatable pin M traversing the holes Q of two of the links of a row, and to proportion the sizes of the balls and the length of the links so that the peripheries of the balls shall rollably contact with the pins to resist cricumferential displacement of a row of balls and to rollably transmit progressive movement of the balls from one row to the next.

According to another feature of my invention I preferably provide rollable axial guidance retainers for resisting axial displacement of the belt even when it is used with gears mounted on parallel shafts. These retainers are especially desirable when such gears are mounted on any shafts, and preferably comprise axially resistant projections or guides at the sides of and for axial engagement with the sides of the gear teeth, preferably of the gear around which the belt is mounted, which teeth are preferably wider than those of the other gear for contacting with the guides S to maintain the belt J between the gears.

This may be accomplished by widening and flaring the outer links of the belt sufficiently to overhang the edges of the teeth, but I preferably make the guides S rotative, with beveled or flared faces T adjacent the sides of the gear for embracing it, and rotatably mount them on the ends of the pins M outwardly of the links L. Thus the guides may roll as they contact with the sides of the spur gear to anti-frictionally resist axial displacement of the belt, or to axially sustain it against gravity when the shafts are vertical. In such case the length of the belt and the projections of the guides should be such that in all positions of the belt its guides will overhang enough of the upper side of its spur gear to axially sustain the belt thereon.

For permitting substantial projection of the guides S across the sides of the spur gear, I preferably alternate the guides at each side of the belt, preferably mounting those at one side rotatably on one of the pins M, and those at the other side rotatably on the other end of the next of the pins M, so that the diameter of the guides S may be greater than the diameter of the balls N.

As usual in such constructions, I preferably provide an oil pocketed casing or well E below the belt K for enclosing the sag of its excess length, and for containing lubricant in which the loose traveling dependent portion of the belt may dip for raising such lubricant from such well to the space between the teeth, so as to utilize the belt as a compression resistant, flexible traveler, chain oiler, for the teeth of the spur gear.

The links L are preferably made from flat sheets, the one surface of which is grooved to half its depth for a width equaling the length of two of its reduced ends, after which the links are punched out of the sheet with their reduced half round ends intersecting the centre of two adjacent grooves, and their circularly perforated body portion cut out from the ungrooved part of the sheet to give them the desired thickness for spacing and retaining the balls, and the desired thinness for their overlapped joints, each link being then reversed as to the next for such overlapping as their pivotal holes are threaded on the pivotal rod or pin M rotatably extended through them.

In operation, a suitable strand of chain will be formed by pivotally connecting its links, on which a series of balls will be mounted, on which a second strand of links will be mounted, on which a second series of balls will be mounted, and so on until the desired width of the belt is attained, whereupon the free ends of the pins will be beaded or fixed to hold those parts axially and circumferentially in relation, so the end links may be separably pin connected.

The belt will then be threaded between its pinions, with its retainer guides S, when used, at each side of the latter. The detachable pin will then be inserted to connect the free ends of the belt, and both pinions will be drivingly intermeshed by the belt, whereupon drive of either shaft and its pinion will transmit rotation to the other pinion by rolling the torque transmission balls against the faces of the reciprocal teeth, which will progress the belt around its pinion flexibly into the sinuous space between the teeth, and permit it to distend by gravity or centrifugal force in advance of and successive to this space, so that, except adjacent the inter-meshed teeth, the belt will more or less recede from contact with the other teeth of its pinion either under the influence of gravity or of centrifugal force.

Figure 5:
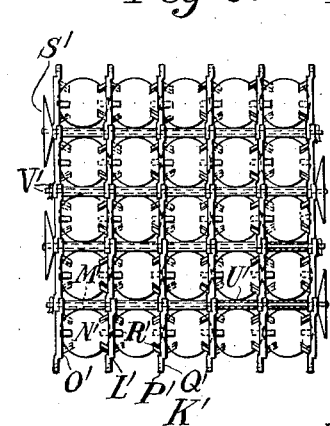
Fig. 5 is a fragmentary face view partly in longitudinal section, showing a modified form of such a belt.
Figure 6:
Fig. 6 is a fragmentary edge view thereof partly in longitudinal section.

A modified construction is shown in Figs. 5 and 6, in which the flexible belt K' has punched metal links L', having a thin perforated body portion O', and oppositely bent ends P', provided with a pivotal hole Q' for connecting them to succeeding links. Each link L' is shown as formed with reversely bent tits R', affording between them a retainer socket for receiving the adjacent peripheries of two balls N', so that these may contact with each other while being retained in axial alignment by these tits. These links are connected by pivotal pins M' fastened by cotters V', and on one end of which are rotatably mounted guide rollers S', and on which pins intermediate the links are rotatably mounted rotatable tubes U', contacting with the peripheries of adjacent balls for revolubly transmitting thrust from one to the other thereof, and for spacing the balls longitudinally of the belt.

A mitre drive modification is shown in Figs. 7, 8, 9 and 10, in which the horizontal drive shaft A' carries a drive bevel spur gear B', reciprocal to a driven bevel spur gear C' keyed to a vertical or right angle driven shaft D' enclosed by an oil well casing E'.

For making my invention available in such a construction the reciprocal drive faces of the tapered teeth of a pair of bevel gears are spaced one from the other, as by forming them with relatively small tapered teeth H', and with relatively large tapered cavities I', affording between the reciprocal teeth in working engagement a tapered sinuous space or clearance J', in which my improved belt may be interposed between the teeth. For such a utilization I preferably provide a tapered rollable anti-frictional, compression torque transmission, sinuous belt K2 around one of the beveled gears and of sufficiently greater length than the toothed circumference thereof to permit the belt to bend into the belt space between the intermeshing teeth, and to depend or discharge itself clear of other teeth, of the bevel gear it surrounds.

The belt K2 may be any suitable flexible antifrictional compression torque transmission endless rollable traveling member of a thickness equaling and corresponding to the space J' between the bevel teeth, and of a width equaling the width of the face of the bevel gears. For tapered bevel gears I prefer to construct it of a continuous mesh of flexibly connected axially spaced links L2 pivotally jointed at their ends by rollable pins M2. In the meshes or spaces between these links I preferably revolubly interposed rollable tapered rollers N2, each of a tapering diameter equaling the space J' between the bevel gears, and sufficiently exceeding the width of the links to rollably space the gears from them, so that the belts consist essentially of an inner and outer endless chain of links, pivotally connected by pivotal pins, and axially spaced by rollable rollers, the whole affording a flexible rollable fabric of sufficient mobility to conform to the convolutions of the intermeshing teeth, and of sufficient compressive resistance to maintain correct mesh of reciprocal teeth and to compressively transmit torque from one tooth to the next while in anti-frictional rollable engagement with them.

The mesh of the belt K2 may be of any suitable construction, but I prefer to make the links L2 of punched metal which will rollably retain the tapered rollers N2 in proper relation, but I prefer to make the tapered rollers N2 tubular, and to rotatably mount them on axial pins M2, which are preferably rotatably mounted in a relatively large chain of outer links L2, and a relatively small chain of inner links L3, proportioned to correspond with the taper of the rollers N2 and to hold each pin in the correct position axially of its roller for rollably positioning the rollers circumferentially of the belt, so that the complete belt has one side edge longer than the other side edge, and is when distended of approximately the shape of a segment of a cone, and may hang vertically from a mitre gear, as shown in Fig. 7.

To guide the belt and resist its displacement by gravity, I preferably provide the links L2 with flared guide portions or projections S2, which are preferably formed on the outer or alternate links by out-bending their sides so that they will engage the outer ends of the beveled teeth and guide the chain on to its pinion and resist downward slippage of it thereon.

To guide the chain at the inner end of the beveled teeth, and to resist tendency of the rollers to slip between the teeth, I preferably provide the inner chain L3 with rollable guide rollers S3, preferably rotatably mounted on every second pin M2 so that their diameter may approximate that of the inner ends of two adjacent tapered rollers, to permit the guide rollers to have sufficient projection to rollably engage the ends of two inter-meshing gears.

In this construction the axial retainer guide rollers S3 are preferably mounted between the inner links L3 and the tubular tapered rollers N2, to rollably act against the inner edges of the spur teeth for resisting wedging action of the rollers, and to space the inner links from the spur teeth, for permitting free movement of the inner links, and for preventing contact between them and the spur teeth. Preferably in this construction the pivotal pins on which the rollers are revolubly mounted for axially spacing and positioning the latter without requiring retainer sockets in the body of the links or rollable spacers intermediate adjacent rolls, and the cotters V2, or other detachable connection for the pins M2, are connected to these pins outwardly of the large links L2 where there is ample clearance for applying or removing them to connect or disconnect the ends of the belt to apply or remove the belt, or to vary its length.

In operation with this form of my invention, the desired numbers of inner links are assembled on their pins, a guide roller is spaced on every alternate pin, the tapered rollers are slid over their pins, the flared retainer links are applied to successive pairs of pins, and the intermediate links are applied intermediate of them, and the cotters V2 or other removable fastenings are applied to the outer ends of all of the pins except those at each end of the belt, the ends being disconnected so that the belt may be threaded through the space between the spur gears, after which the free ends of the belt are connected by applying intermediate inner and outer links, whereupon it constitutes an endless flexible, compression torque transmission, sinuous, rollable belt, rollably movable through the sinuous space between the opposed faces of two inter-meshed teeth of the spaced gears, for transmitting torque stress circumferentially of these, and compressively through the belt, across the space between their inter-meshed teeth.

Preferably axially adjustable bearings W are provided for one or more of the spur gears, in such a utilization, for relatively adjusting these gears to maintain their inter-meshing teeth in proper relation to the guides carried by the belt. These adjustable bearings are preferably provided for both gears when these have beveled teeth, to extend the clearance between their teeth for facilitating threading of the belt between the latter, and to permit adjusting the beveled teeth into correct relation with the belt, which may best be determined by operating the gears after the belt has been made endless by uniting its separable ends.

For the parallel gears shown in Fig. 1, the bearing W for the lower gear is preferably axially adjustable for adjusting such gear axially of the upper bearing, and the bearing for the upper shaft is preferably, as shown in another utilization of my present invention, made as a hemicircular female bearing X spaced from the shaft to afford an arc-shaped space above the latter, in which space I preferably rollably mount my plain flexible rollable belt Y. The latter is preferably identical with the belt K, except that it is devoid of axial guide rollers, being guided axially in the space between the casing E and the side of the driven pinion C. The belt Y flexes as it comes around the shaft, and then expands around the lower shaft and dips into the oil well casing for lubricating the bearing of the upper shaft as it rollably transmits stress through its thickness from the upper shaft of the bearing.

In all cases the depth of the rollable, compression torque transmission elements of the belt should equal and not exceed the space through which such elements are rollable, and if any part of the web of the belt passes through such space the thickness of such part should not exceed, and should be less, than the depth of such space, and preferably the rollable compression torque transmission elements extend beyond each side of the face of the web and have exposed contact portions projected beyond each face of the latter.

In the modification shown in Figs. 11 and 12, the belt K4 consists of two chains of links L4 connected by pivotal pins M4, each carrying a single rotary spacer tube U4, and the balls N4 are perforated spheres rotatably threaded on non-rotary retainer pins R4, on alternate ones of which the rollable guides S4 are rotatably mounted.

In the modification shown in Figs. 13 and 14, the web of the chain K5 consists of a plurality of perforated U-shaped links L5, pivotally connected by pins M5, alternately carrying rollable guides S5, carrying individual spacer tubes U5, and the balls N5 are solid spheres seated in the perforations of the U-shaped links.

In the modification shown in Figs. 15 and 16, the belt K6 consists of a woven fabric or pair of moulded rubber halves L6, having overhung or undercut interstices R6, in which solid spheres N6 are rotatably seated, and having pin cavities Q6 in which are mounted pivotal pins M6 carrying rollable spacer tubes U6 for rollably antifrictionally spacing the balls.

In the modification shown in Figs. 17 and 18, the chain K7 consists of links formed of twisted wire rings L7, the eyes P7 of which are connected by pins M7, carrying individual spacer tubes U7, and the balls N7 are seated in the retainer cavities R7 afforded by the loops of the rings.

In the modification shown in Figs. 19 and 20, the belt K8 consists of two chains of links L8, pivotally connected by the ends of cylindrical rollers N8, on the alternate outer ends of which guide rollers S8 are held by cotters V8. In such construction the stress of the chain resists rotation of the rolls, which is not the case when the pivotal pins connect the links and the rolls are connected to the links intermediate such pins and are spaced by the tube or tubes rotatably mounted on such pins, as in the other constructions, which latter relieve the rolls of all chain stress.

In the modification shown in Fig. 21, the chain K9 consists of links L9, pivotally connected by non-rotary rods R9, fastened by cotters V9, and carrying intermediate their ends non-rotary pins M9, and elastic and radially yieldable spiral wound rollers N9 are revolubly mounted on the rods R9, and spaced by similar spacer rollers U9 revolubly mounted on the pins M9, and the guide S9 is formed by out-bent sides of alternate links L9, a construction in which the compression torque transmission through the thickness of the belt is cushioned.

In the modification shown in Fig. 22, the chain K10 consists of links L10, connected by solid conical rollers N14, and solid conical spacers U14, and pivotally connected by non-rotary pins M10, some of the pins M10 carrying sectional tubular rollers N10, consisting of a series of rollable members of successively different diameter, and some of the pins M10 carrying sectional rollable tubular spacers U10, consisting of a series of tubular balls U11, of successively different diameter.

In the modification shown in Fig. 23, the chain K11 has links L11, connected by non-rotary pins M11, on the alternate ones of which are threaded tubular semispherical rollers N11, of successively different diameter, and on intermediate ones of which are threaded semispherical tubular spacer balls U11, of successively different diameter.

In the construction shown in Fig. 24, the belt K12 consists of a rubber web L12, and of lateral and longitudinal series of rollably movable solid rollable spheres or balls N12, of successively different diameter, and having diametrically opposite contact portions exposed beyond the surface of the web, and of intermediate rollably movable solid spacer spheres or balls U12, the balls N12 being partially circumferentially embedded in the web, and the spacers U12 being completely embedded in the web and in contact with the peripheries of longitudinally successive balls N12, for spacing these from one another longitudinally of the belt, and the balls and spacers of each lateral series being slightly staggered longitudinally relatively to those of laterally adjacent longitudinal series, or arranged in a curved or arc shaped relation across the belt, suitable for transmission of torque stress through the thickness of the belt when it is used between the spaced teeth of spiral or helical gears.

My invention is not limited to the particular details of construction, use, or combination of elements, set forth as constituting the adaptations thereof, herein shown, since it may be availed of in whole or in part according to such modifications as circumstances, or the judgment of those skilled in the art, may dictate, without departing from the spirit of the invention.

What I claim is:

1. In an anti-frictional stress transmission device, comprising a series of longitudinally rollably connected, diametrically stress resistant, rollable members having external peripheries having diametrically opposite exposed contact portions operable to receive stress at one side of and to rollably transmit it at right angles to the direction of rollability of said members to the other side of said members, and web means rollably connected to said rollable members and by which the latter are rollably positioned, of less thickness than the diameter of said rollable members and connected thereto intermediate said exposed portions thereof, movable in said direction with said members and being operable to in said direction space and rollably connect said rollable members and to permit the latter to rollably transmit said stress from without one side of said web means and across the thickness of the latter to without the other side of said web means without subjecting said web means to said stress; the combination therewith of rollable longitudinal spacer means between and in rollable contact with the external peripheries of longitudinally adjacent ones of said rollable members, rollable in reverse direction to the rollability thereof, rollably carried by said web means, and being operable to rollably space said members in said direction of their rollability by rollable contact with the external peripheries thereof.

2. In the stress transmission device specified in claim 1, said rollable spacer means being of less diameter than said rollable members being rollably disposed and operable intermediate said exposed portions thereof.

3. In the stress transmission device specified in claim 1, said web means comprising rollable lateral restrainer means at the side of and rollable relatively to said rollable longitudinal spacer means, in operative relation thereto, and being operable to rollably axially restrain them.

4. In the stress transmission device specified in claim 1, said web means comprising rollable lateral restrainers at the side thereof, rollable relatively to said rollable members, in operative relation thereto, and being operable to rollably laterally restrain said web means.

5. In an anti-frictional stress transmission device, comprising a series of longitudinally spaced, rollably connected, diametrically stress resistant, rollable spheres, having external peripheries having diametrically opposite exposed contact portions operable to transmit stress at right angles to the direction of their rollability from one to the other side of said spheres, and web means rollably connected to said spheres, movable in said direction therewith and being operable to rollably longitudinally connect the latter, of less thickness than the diameter of said spheres and disposed intermediate said exposed portions, and being operable to permit said spheres to transmit said stress from without one side of said web means across the thickness thereof and to the other side thereof subjecting said web to said stress; the combination therewith of rollable longitudinal spacer means disposed between and in rollable contact with the adjacent external peripheries two longitudinally adjacent of said spheres, rollable in reverse direction to the rollability thereof, rollably carried by said web means, and being operable to rollably longitudinally space said spheres by rollable engagement with their adjacent external peripheries.

6. In an anti-frictional stress transmission device, comprising a plurality of series of longitudinally spaced, stress resistant, rollable spheres, having external peripheries having diametrically opposite exposed contact portions operable to transmit stress at right angles to the direction of their rollability and from one side to the other side of said spheres, and web means revolubly connected to said spheres, movable in said direction therewith and being operable to revolubly longitudinally connect said spheres, of less thickness than the diameter of said spheres and disposed intermediate said exposed contact portions thereof, and being operable to permit said spheres to transmit said stress from without one side of said web means, across the thickness thereof and to without the other side thereof, without subjecting said web means to said stress; the combination therewith of rollable longitudinal spacer means between and in rollable contact with the external peripheries of longitudinally successive ones of each series of said spheres, rollable reversely to the direction of rollability thereof, and being operable to rollably longitudinally space said spheres by rollable contact with the external peripheries thereof.

7. In the transmission device specified in claim 6, said rollable spacer means intermediate laterally adjacent of said spheres, being rollable relatively to one another, in operative relation to the external peripheries of longitudinally adjacent of said spheres respectively, and being operable to relatively rollably longitudinally space the latter respectively.

8. In an anti-frictional stress transmission device, comprising laterally adjacent series of longitudinally successive, stress resistant, rollable spheres, having diametrically opposite exposed contact portions operable to transmit stress at right angles to the longitudinal and lateral disposition of said series and from one side to the other side of said spheres, and web means revolubly connected to said spheres, movable therewith in the direction of rollability thereof, and operable to longitudinally and laterally position said spheres, of less thickness than the diameter of said spheres, disposed intermediate said exposed contact portions thereof, and being operable to permit laterally adjacent spheres to laterally contact and position one from another, and to permit said spheres to transmit said stress from without one side of said web means, across the thickness thereof and to the other side thereof, without subjecting said web means to said stress; the combination therewith of rollable lateral restrainer means rollably carried by said web means, in rollable operative relation to said spheres, and being operable to rollably laterally restrain said spheres of adjacent of said series in laterally contactive position one with another.

9. In an anti-frictional stress transmission device, comprising a series of longitudinally successive stress resistant rollable spheres, having external peripheries having diametrically opposite exposed contact portions operable to transmit stress at right angles to the direction of their rollability and from one side to the other side of said spheres, and apertured retainer means revolubly connected to said spheres, movable therewith in direction of their rollability, and operable to revolubly longitudinally position said spheres, of less thickness than the diameter of said spheres, and disposed intermediate said exposed contact portions thereof, having apertures around other portions of said spheres and within which said other portions are rollably mounted, said apertures being operable to retain said spheres within said apertures and to expose said contact portions thereof without the thickness of said retainer means, and thereby to permit said spheres to transmit said stress from one side of said retainer means, across the thickness thereof and to the other side thereof, without subjecting said retainer means to said stress; the combination therewith of rollable longitudinal spacer means rollably carried by said retainer means intermediate said apertures, between and in rollable contact with the adjacent external peripheries of longitudinally adjacent ones of said spheres, rollable in reverse direction to the direction of rollability thereof, and being operable to rollably longitudinally position said spheres by rollable engagement with the adjacent external peripheries of said spheres.

10. In the stress transmission device specified in claim 9, said apertured retainer means having intermediate longitudinally successive of said spaced means a contracted portion at each side of each of said apertures and adjacent each of said exposed contact portions, in operative relation to said spheres, and being operable to overhang and position said spheres relatively to said rollable spacer means.

11. In the transmission device specified in claim 9, said retainer means having semi-spherical apertures around and in operative relation to portions of said spheres intermediate said contact portions thereof, and being operable to position said spheres relatively to said rollable spacer means.

12. In the transmission device specified in claim 9, said retainer means comprising opposed complementary parts connected together and having reciprocal flared apertures, the larger diameters of which are adjacent to each other and the smaller diameters of which are around and revolubly embrace portions of said spheres intermediate said exposed portions thereof, and being operable to position said spheres relatively to said rollable spacer means from within said apertures and to permit said exposed portions to transmit said stress therethrough without subjecting said retainer means to said stress.

13. In the transmission device specified in claim 9, said retainer means comprising an apertured member having sphere apertures around the peripheral portions of said spheres intermediate said exposed contact portions, and having spacer recesses intermediate said sphere apertures, and being operable to revolubly relatively position said spheres and said rollable spacer means, and to permit said contact portions to transmit stress from one side of, through the thickness of and to the other side of said retainer, without subjecting the latter to said stress.

14. In the transmission device specified in claim 9, said retainer means being a flexible web around said rollable spacer means and said spheres and within which the latter are rollably mounted with their opposite contact portions exposed beyond the opposite sides of said web, and being operable to rollably position said spacer means intermediate the external peripheries of said spheres, and to permit the latter to transmit said stress from one side of and through said web to the other side thereof, without subjecting said web to said stress.

15. In an anti-frictional stress transmission device, comprising a series of longitudinally successive rollable members, having diametrically opposite exposed contact portions operable to receive stress at one side of said members and to rollably transmit said stress through said members to the other side thereof in direction at right angles to the direction of rollability of said members, said members being respectively relatively rollable, and retainer means rollably connected to said members of each of said series, movable in the direction of their rollability and with said members during rollability thereof, operable to relatively rollably connect each of said members with each of the others of said members, of less thickness than the diameter of said members, disposed intermediate said exposed portions thereof, and operable to permit said members to transmit said stress from without one side of said retainer means, across the thickness of the latter, and to the other side thereof, without subjecting said retainer means to said stress; the combination therewith of flared axial restrainer means carried by said retainer means, in operative relation to said rollable members, projected beyond the periphery thereof, and being operable to laterally position said retainer means and said rollable members from beyond the peripheries of the latter during movement thereof in the direction of rollability of the latter.

GEORGE HOLT FRASER.